Figure 1:
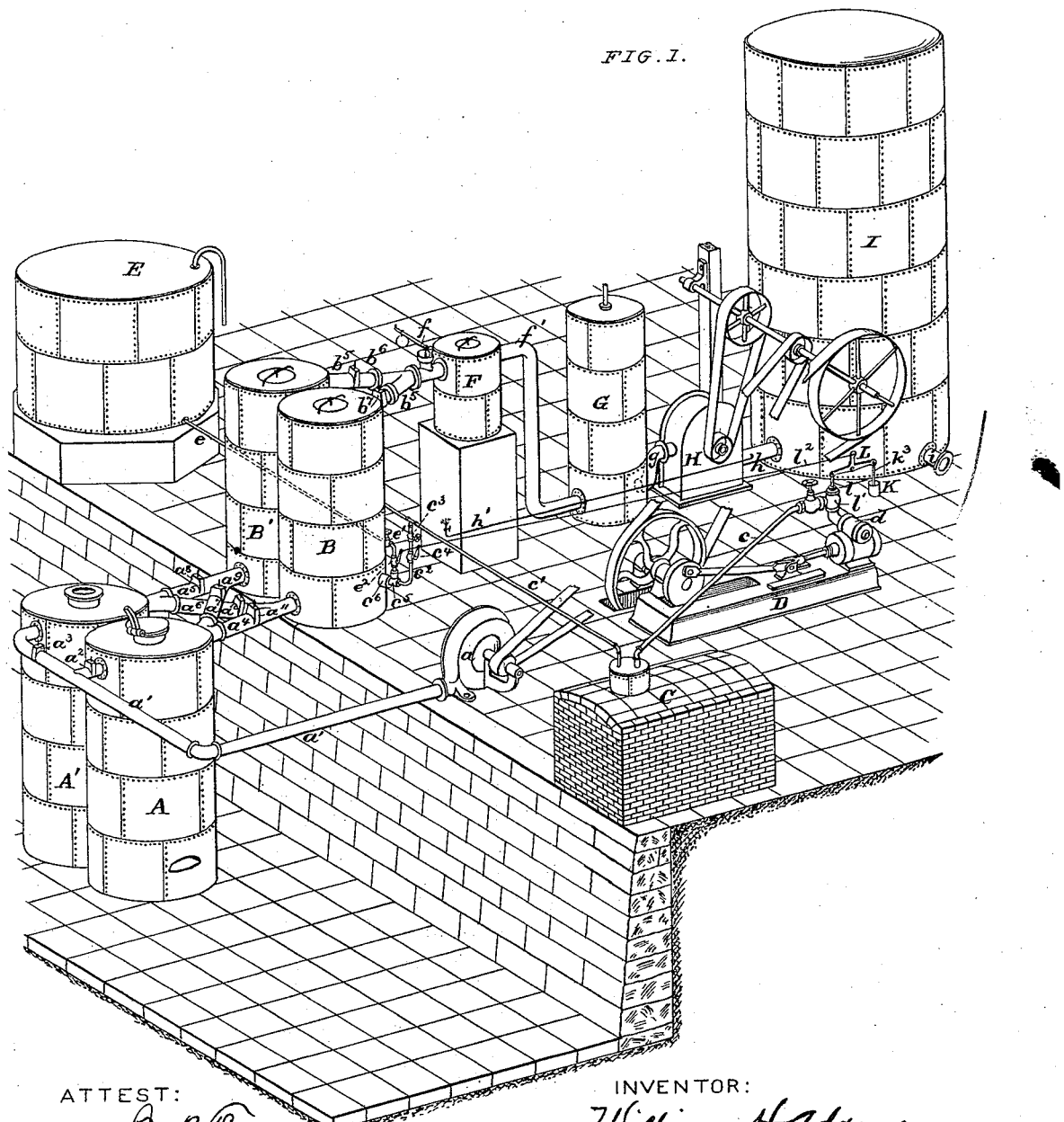

(No Model.) 2 Sheets—Sheet 1.

W. H. ADAMS.
APPARATUS FOR THE MANUFACTURE AND DELIVERY OF HEATING AND ILLUMINATING GAS.

No. 291,860. Patented Jan. 15, 1884.

ATTEST:
J. P. Town
W. C. Chaffee

INVENTOR:
William H Adams
per Hill & Dixon
ATTORNEYS.

(No Model.) 2 Sheets—Sheet 2.
W. H. ADAMS.
APPARATUS FOR THE MANUFACTURE AND DELIVERY OF HEATING AND ILLUMINATING GAS.
No. 291,860. Patented Jan. 15, 1884.
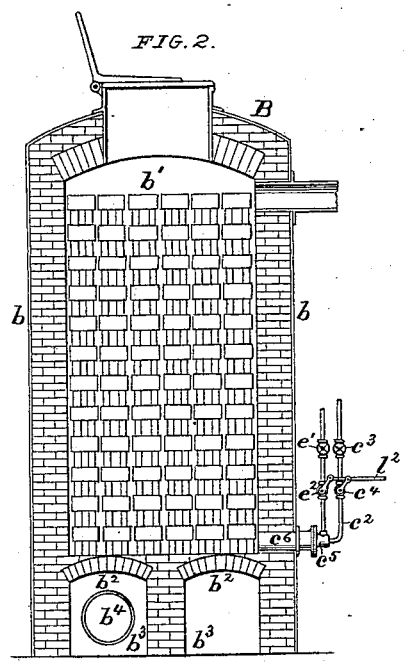
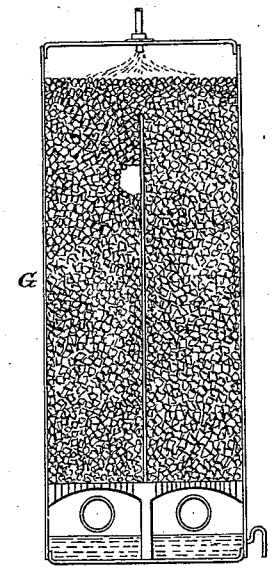
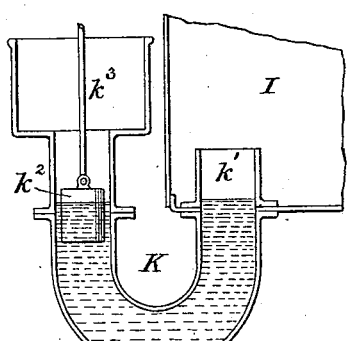
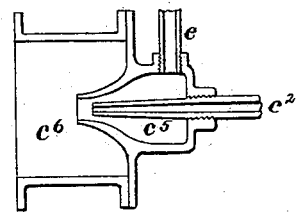
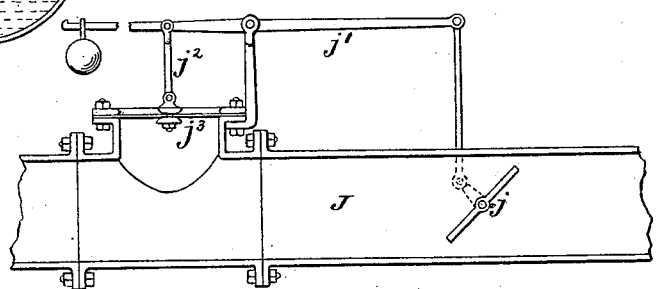
ATTEST:
INVENTOR: William H. Adams
per Hill & Dixon
ATTORNEYS.

UNITED STATES PATENT OFFICE.

WILLIAM H. ADAMS, OF CHICAGO, ILLINOIS.

APPARATUS FOR THE MANUFACTURE AND DELIVERY OF HEATING AND ILLUMINATING GAS.

SPECIFICATION forming part of Letters Patent No. 291,860, dated January 15, 1884.

Application filed December 4, 1882. (No model.)

*To all whom it may concern:*

Be it known that I, WILLIAM H. ADAMS, of Chicago, Cook county, Illinois, have invented an Improved Apparatus for the Manufacture and Delivery of Heating and Illuminating Gas, of which the following is a description, reference being had to the accompanying drawings, in which—

Figure 1 is a perspective view of the apparatus employed in my improved system. Fig. 2 is a vertical section, taken across one of the gasogenes B, Fig. 1. Fig. 3 is a vertical section of the scrubber G, Fig. 1. Fig. 4 is a vertical section of the pressure-regulator K, Fig. 1. Fig. 5 is a longitudinal section of the injector for steam and oil or hydrocarbons $c^5$, Fig. 1. Fig. 6 is a longitudinal section of the diminishing-pressure regulator J, to be attached to the delivery-pipe I, Fig. 1.

In the present system of manufacture and delivery now almost universally employed in gas-works the gas is generated in a series of retorts and then stored in huge gas-holders, from which it is delivered in pipes radiating to the consumers. This system involves a very large expenditure of capital in the construction of the plant, occupying considerable area of ground, often very valuable, and involving continued and expensive repairs, especially in the use of the retorts, while the gas-holder, costing thousands of dollars, is the most expensive part of the entire plant. Moreover, in this system, after the expensive plant is completed and the works are in operation, it is well understood that the retorts extract but a small portion of the gas contained in the coal, and that the gas stored in bulk in the huge gas-holders rapidly deteriorates in illuminating qualities, and this deterioration in the holders has long been one of the most serious difficulties encountered by the gas-manufacturers, occasioning continued losses to them and complaint on the part of consumers because of the quality of the deteriorated gas delivered to them.

My improved system entirely overcomes the serious difficulties above mentioned. The plant can be constructed at comparatively small expense, and occupies but a limited area of ground. It also dispenses with the use of the costly and cumbersome gas-holders, and as the gas is produced only as it is consumed, the great deterioration arising from its storage is avoided.

In the working of my improved system a large variety of apparatus differing in details of construction in its various parts may be employed; but I will here describe what I consider to be the preferable form.

In the drawings, A A' are producers of carbonic oxide or other heating gas. These may be of any of the well-known forms of construction, in which the gas is manufactured by forcing air, by pressure, through incandescent fuel contained in an air-tight generating chamber or chambers. The producers are of such capacity and number as to produce, under the blast of air, a continuous stream of carbonic-oxide gas of requisite amount. This blast of air is supplied to the producers A A' by means of the fan $a$, driven by belting or other suitable connection with the engine. The fan $a$ forces the air through the pipe $a'$ into the producers A A', according to the adjustment of the valves $a^2$ $a^3$. Pipes $a^4$ $a^5$, with cross-pipes $a^6$ $a^7$, convey the carbonic-oxide or other heating gas from the producers A A' to the gasogenes B B', any number of which may be employed. Valves $a^8$ $a^9$ $a^{10}$ $a^{11}$ are placed in the pipes, as shown in the drawings, so that by their adjustment the carbonic-oxide gas from either or all of the producers A A' can be conveyed directly into either of the gasogenes B B'.

The gasogenes B B' are constructed in any of the well-known or suitable forms or methods for the production of illuminating-gas. The preferable form of construction is shown in vertical section, Fig. 2, in which a shell of boiler-iron, $b$, suitably lined, incloses a quantity of fire-brick or other refractory material, $b'$, piled up with interstices in the well-known manner, and resting upon double arches $b^2$. These arches $b^2$ form the roofs of the usual combustion-chambers, $b^3$, into one of which the pipe $a^{11}$ enters at $b^4$, introducing the carbonic-oxide gas from the producer A, and cold or heated air being admitted into the other chamber, $b^3$, the wall between the two combustion-chambers being filled with interstices. If preferred, streams of atmospheric air and carbonic-oxide gas may be united before their entrance to combustion-chambers $b^3$, or they may impinge against each other in those combustion-chambers by a suitable arrangement of pipes. A steam-boiler, C, is provided with a pipe, $c$, leading to the steam-chest of the engine D, and also with a pipe, $c'$, leading to the gasogenes B B'. The steam from the pipe $c'$ is conveyed into the gasogenes B B' by branch pipes $c^2$, which are provided with hand-valves $c^3$ and the automatic valves $c^4$. The steam from the branch pipes $c^2$ enters the gasogene B through the injector $c^5$ into a narrow space, $c^6$, opening into B. A tank, E, is filled with naphtha, oil, or other hydrocarbon, which is conveyed to the gasogenes B B' through the pipe $e$, which is also provided with a hand-valve, $e'$, and an automatic valve, $e^2$, and delivers the naphtha, oil, or other hydrocarbon into the injector $c^5$, and thence into the small chamber $c^6$. Pipes $b^5$, provided with suitable valves, $b^6$ $b^7$, conduct the gas generated in the gasogenes to the seal F. A suitable safety-valve, $f$, of any of the well-known forms of construction, is connected with the pipes leading from the gasogenes, and so adjusted that when, by accident or otherwise, the pressure therein arises above a certain limit the valve will open and allow the excess of gas to escape. The seal F may be of any of the well-known forms of construction employed in gas-works, and is employed to prevent the accidental admission of air into the gasogenes B B' or their connections when filled with gas. From the seal F the gas passes through the pipe $f'$ to the scrubber G, of any of the well-known or suitable forms of construction. The preferable form of construction, as shown in vertical section in Fig. 3, will be readily recognized by gas-manufacturers as illustrating a well-known form. The gas passes from the scrubber G through the pipe $g$ to the exhauster H, which is driven by belting or other suitable connection with the engine.

In the manufacture of illuminating-gas the gas from the scrubber G, in the pipe $g$, is made to pass through one or more purifying-boxes in its transit to exhauster H. It is unnecessary to describe these purifying-boxes, as any of the variety of forms well-known to gas manufacturers may be employed.

In the manufacture of heating-gas it is conducted from the scrubber G directly into the exhauster H without passing through purifying-boxes. The gas is forced by the exhauster H through the pipe $h$ into the air-tight pressure-box I, whence it passes through the pipe $i$ into the mains through the regulator J. (Shown in longitudinal section in Fig. 6. The regulator J may be of any of the well-known forms of regulators for receiving elastic fluids at varying high pressure, and delivering the same at a uniform low pressure.

In the form illustrated in Fig. 6 a butterfly-valve, $j$, is inserted in the pipe, and connected by a rod to one end of a pivoted weigted lever, $j'$, the weighted end of the lever being connected by a rod, $j^2$, to a flexible diaphragm, $j^3$, placed over an opening in the pipe back of the butterfly-valve. As the pressure in the pipe or pressure-box I is increased or diminished, the diaphragm is vibrated upward or downward, thus closing or opening the butterfly-valve $j$, and insuring a uniform delivery of gas to the mains at moderate pressure, whatever the pressure in the pressure-box I. The pressure-box may be of any suitable size, form, or proportion, but preferably should be of about the relative proportions shown in the drawings. It is not absolutely indispensable, but I regard it as a valuable auxiliary to my system, inasmuch as the flowing gas passing through it forms an elastic body, which acts as a cushion to withstand any irregularity or strain in the action of the machinery, and also, by its accumulation of pressure back of the regulator J, a volume of supply is assured to meet any instantaneous increase in the consumption of the gas. A small gas-pipe, $h'$, leads from the pipe $h$ forward to the gasogenes B B', where it terminates in a burner, which, when lighted, enables the workmen to readily determine the quality of gas produced.

This apparatus may be used for producing either heating or illuminating gas, some of the parts for the production of the latter being unnecessary for the former.

The operation in the manufacture of illuminating-gas is as follows: The producers A A' are filled with fuel brought to an incandescent condition, and steam is admitted to engine D, causing the fan $a$, by its rapid revolutions, to force a blast of air into the producers A A', the exhauster H being for the moment disconnected from the driving-shaft. The valves $a^8$ $a^9$ $a^{10}$ $a^{11}$ are at this time adjusted so as to deliver the gases from the producers into the gasogene B, the top of which is temporarily open while the valve $b^7$ is closed. The carbonic-oxide gas generated in large volumes in the producers A A' is thus conveyed into the gasogene B, where, in connection with atmospheric air, it is lighted and burned until the brick-work $b'$ in said gasogene is brought to a high heat. The top of the gasogene B' is now opened, the valve $b^6$ being already closed, the valves $a^8$ $a^9$ $a^{10}$ $a^{11}$ are changed, so as to direct the carbonic-oxide gas into the gasogene B' in the same manner and for the same purpose as it had been in the other. While the gasogene B' is thus heating up the manufacture of illuminating-gas is commenced in the already heated gasogene B in the following manner: The top of this gasogene is closed and luted, and the exhauster set into operation, and the valve $b^7$ opened at the same time. Steam is admitted from the pipe $c'$ and hydrocarbons from the pipe $e$ into the injector $c^5$ in proper proportions, and thence into the gasogene B, where it is decomposed by contact with the heated brick, and a rich illuminating-gas is produced. The gas is conveyed from gasogene B through the pipe $b^5$, seal F, and pipe $f'$ into the scrubber G, and thence by the pipe $g$ through the usual purifiers to the exhauster H, which forces the gas into the pressure-box I, and thence through the pipe $i$ and regulator J into the mains. When the brick in the gasogene has cooled, so as to produce a gas, shown by the burner upon the tube $h'$, to be below the fixed standard, the steam and hydrocarbon pipes leading thereto, together with valve $b^1$, are closed, and the pipes leading from the producers A A', conveying the carbonic-oxide gas to the gasogene B', are closed, and the carbonic-oxide gas is turned again into the gasogene B, the top of which is immediately opened, and the gas is lighted for the purpose of again heating up this gasogene. Meanwhile the steam and hydrocarbon pipes leading into gasogene B' are opened, causing the production of illuminating-gas for the time being to take place therein, and this alternate use of the gasogene is repeated continuously, thus insuring a continuous production of illuminating-gas by the combined apparatus. In the production of heating-gas the same method may be pursued, or, if preferred, the steam-pipe $c'$ and hydrocarbon-pipe $e$ may be entirely closed, and the carbonic-oxide gas produced in the producers A A' may be passed, either through the gasogenes B B' or by branch pipes, (which I have not deemed it necessary to show in the drawings,) directly to the seal F, and thence through the pipe $f$ and scrubber G, pipe $g$ to the exhauster, and then through pipe $h$, as before. If desired, the branch pipes may run directly from the producers A A' to the pressure-box I, or to the mains, thus cutting out all the intermediate parts used in the manufacture of illuminating-gas; but it will be preferable in large systems having extensive mains to keep the seal, scrubber, exhauster, and pressure-box in working connection with the apparatus even in manufacturing heating-gas. It will now be seen that I have described an apparatus in which, when employed for the manufacture of illuminating-gas, the contents of the pipes or vessels situated between the exhauster H and the place or places where the gases to be consumed are under mechanical pressure applied by the power of the machinery through the medium of the exhauster H, and in which, when employed for the manufacture of heating-gas, the contents of all the pipes and vessels situated between the fan and the place or places where the gas is to be consumed are under a similar pressure derived from the pressure-fan $a$. This pressure throughout the system (which for convenience I shall hereinafter term the "fluid-pressure" of my system) enables the production and delivery of gas to be automatically controlled by the fluid-pressure of the system itself.

I will now describe one way in which this principle of fluid-pressure may be applied in practice.

K is an automatic valve-regulator, (shown in vertical section in Fig. 4,) and connected either with the pressure-box I, as shown in Fig. 1, or with the pipes $h\ i$, or with any other part of the system, in which the fluid-pressure above referred to exists, the single essential feature in its location and connection being that it shall communicate with the fluid, which is under pressure, and be controlled thereby.

As shown in the drawings, a curved pipe, $k$, in form of an inverted siphon, is constructed with one of its ends opening into the pressure-box I, and the other end rising outside the pressure-box I, and having its interior space nearly filled with water, tar, or other liquid. A weighted float, $k^2$, is inserted within the outer end of the pipe $k$ and floats upon the liquid contained within the pipe. A rod, $k^3$, is attached to the weighted float $k^2$ and passes upward out through the enlarged end of the pipe $k$, and is attached at its upper extremity to an arm of a pivoted lever, L. Lever L is pivoted to a standard bracket or other suitable support. A rod, $l$, is also attached at one end to an arm of the lever L, and at its other end to a valve, $l'$, controlling the entrance of steam from the boiler C to the steam-chest $d$ and the engine D. A rod, $l^2$, is attached at one end to an arm of the lever L, and at its other end to the handles of the valves $e^2\ c^4$, as clearly shown in Figs. 1 and 2. The attachments of the rods $l\ l^2$ to the valves $l'\ e^2\ c^4$, respectively, and to the arms of the lever L, are made adjustable by set-screws or otherwise, so that the relative movements of parts may be varied, as desired. The float $k^2$, Fig. 4, is so weighted and adjusted that when the fluid-pressure rises above any given degree considered desirable it forces the float upward by such increased pressure, causing the lever L to vibrate, and by means of the connecting-rods $l\ l^2$ to operate the valves $l'\ e^2\ c^4$, so as to reduce the amount of steam admitted to the engine D, and also the amount of steam and hydrocarbon admitted to the gasogenes B B', a still greater increase in the fluid-pressure insuring the closing of said valves, thus reducing or entirely stopping the production of gas. When through the consumption of the gas the fluid-pressure in the system is again diminished, the float $k^2$ falls, causing the steam to be readmitted in increased quantity to the engine, and the steam and hydrocarbons to be readmitted in increased quantities to the gasogenes. It will thus be seen that the production of the gas and the action of the entire mechanism are controlled and regulated automatically by the fluid-pressure within the system, thereby insuring a uniform and steady production and supply of gas proportionate to the amount consumed.

The form of the regulator K, hereinabove described, is one of the simplest, although, as already intimated, any one of a great variety of forms may be adopted, which, however, I do not deem it necessary, nor is it practicable, herein to describe; but I would state that the application of my automatic regulating principle may be varied in one respect, so as to produce an equivalent in the following manner, to wit: Where an exhauster is used, the rapid working of the exhauster produces a fluid-pressure on the discharge side and tends to produce a vacuum on the suction side, the degree to which the internal pressure is reduced on the suction side being of course approximately proportionate to the speed of the exhauster, and hence approximately proportionate to the fluid-pressure on the discharge side of the exhauster, and as a consequence thereof the fluid-pressure on the suction side of the exhauster will vary more or less with the variation of the pressure on the discharge side. It is therefore possible to arrange the automatic regulator whether it be in the form of K or of any form better adapted to such position on the suction side of the exhauster, and to cause it to operate either by the pressure of the contained fluid on that side of the exhauster or by the pressure of the atmosphere tending to enter and fill the partial vacuum created by the exhauster.

I do not deem it necessary to describe the details of this modification, because any skilled mechanic familiar with the art, having the aid of this suggestion, together with the description of my automatic regulator hereinabove contained, could make and apply the same without the exercise of invention. It will be observed in this modification, as well as in the form shown in the drawings, the automatic control of the entire apparatus is affected directly or indirectly by the varying pressure of the fluid contained within the pipes or vessels comprising the system. By this system of gas manufacture and delivery above described a stream of gas of the requisite volume is continuously produced and delivered at a moderate pressure to the mains, and the production is automatically regulated and controlled within the limitations required by the pressure of the gas already produced, and this is accomplished in a simple, reliable, and inexpensive manner, and without any deterioration in the quality of the gas.

What I claim as my invention, and desire to secure by Letters Patent, is—

1. In an apparatus for manufacturing carbonic-oxide gas, with or without the addition of steam and hydrocarbon, and consisting of a system of air-tight continuously-communicating chambers and pipes extending from the air-forcing apparatus to and through the producers, and thence to the service-mains, the combination of the producers, the pipe for supplying a controllable quantity of air under pressure to the producers, the fan or air-pump for forcing the air-supply through said pipe to the producers, the pipe or pipes for delivering away the produced gas, the regulator operated automatically by the variable pressure of the produced gas, substantially as described, and operating mechanism connecting the air pump and regulator, whereby the quantity and pressure of the air forced to the producers is automatically regulated and controlled by the varying fluid-pressure of the produced gas, as herein set forth.

2. In an apparatus for manufacturing carbonic-oxide gas, with or without the addition of steam and hydrocarbon, and consisting of a system of air-tight continuously-communicating chambers and pipes including the producers and the pipe or pipes for delivering away the produced gas, the combination of the producers, the air-duct through which air is admitted to the producers for the manufacture of gas, and the regulator operated automatically by the variable pressure of the produced gas and connecting mechanism, whereby the admission of air into the producers is regulated and controlled automatically by the fluid-pressure of the produced gas, as herein set forth.

3. In an apparatus for manufacturing carbonic-oxide gas and enriching it by steam and hydrocarbon, and consisting of a system of air-tight continuously-communicating chambers and pipes including the producers, the gasogenes, and the gas-delivery pipes, the combination of the producers, the gasogenes, the air-duct for admitting air to the producers, the ducts for admitting steam and hydrocarbon to the gasogenes, and the regulator, substantially as described, and connecting mechanism, as described, whereby the variable pressure of the produced gas automatically regulates and controls the admission of air to the producers and the admission of steam and hydrocarbon to the gasogenes, as herein set forth.

4. In an apparatus for the manufacture of gas, the combination of a regulator actuated by the varying fluid-pressure within the system, the exhauster, the valves controlling the admission of steam and hydrocarbons to the gasogenes, and the fan creating the blast of air to the producers, all connected by suitable mechanism, whereby the production of the gas is automatically regulated and controlled by said fluid-pressure, substantially as described.

5. In an apparatus for the manufacture of gas, the combination of an exhauster, a pressure-box, a regulator automatically controlling the production of the gas, and a regulator controlling the delivery of the gas into the mains, substantially as described.

WILLIAM H. ADAMS.

Witnesses:
W. E. CHAFFEE,
C. N. IMLAN.